United States Patent [19]

Magid

[11] Patent Number: 5,607,376
[45] Date of Patent: *Mar. 4, 1997

[54] CONVERTIBLE TREADMILL APPARATUS WITH LEFT AND RIGHT FOOT BELTS

[76] Inventor: Sidney H. Magid, 1100 Gough St., No. 10A, San Francisco, Calif. 94109

[*] Notice: The term of this patent shall not extend beyond the expiration date of Pat. No. 5,538,489.

[21] Appl. No.: 541,599

[22] Filed: Oct. 10, 1995

Related U.S. Application Data

[63] Continuation-in-part of Ser. No. 276,996, Jul. 19, 1994, Pat. No. 5,538,489, which is a continuation-in-part of Ser. No. 236,585, May 2, 1994, abandoned, and Ser. No. 169,143, Dec. 17, 1993, Pat. No. 5,411,279.

[51] Int. Cl.⁶ .................................................... A63B 22/02
[52] U.S. Cl. ................................................ 482/54; 482/69
[58] Field of Search ......................... 482/69, 54; 198/783

[56] References Cited

U.S. PATENT DOCUMENTS

| | | | |
|---|---|---|---|
| 4,204,673 | 5/1980 | Speer | 482/54 |
| 5,411,279 | 5/1995 | Magid | 482/54 |
| 5,538,489 | 7/1996 | Magid | 482/54 |

Primary Examiner—Lynne A. Reichard
Attorney, Agent, or Firm—Douglas E. White; Acronational Law Firm

[57] ABSTRACT

A treadmill or walker apparatus includes a mounting base, a pair of front rollers mounted fixedly on rotatable left and right front shafts which coaxially extend from a left front side to a right front side of the mounting base, a pair of rear rollers mounted rotatably on at least one rear shaft which extends from a left rear side to a right rear side of the mounting base, endless left and right foot belts engaging respectively one of the front rollers and one of the rear rollers, and a support unit disposed between the front and rear rollers to provide a supporting surface for the foot belts. The foot belts move independently and are to be treaded individually by the feet of the user, thereby preventing the action of the user's left foot from influencing the action of his right foot and vice-versa when the apparatus is in use. The apparatus may be used with a functional supporting frame that is in the form of a baby chair, a baby stroller, an exercise walker or any other suitable form. Disclosed structures include freely moving left and right side belts, fixed-tandem concurrently moving left and right side belts, and the latter moved by a motor.

9 Claims, 4 Drawing Sheets

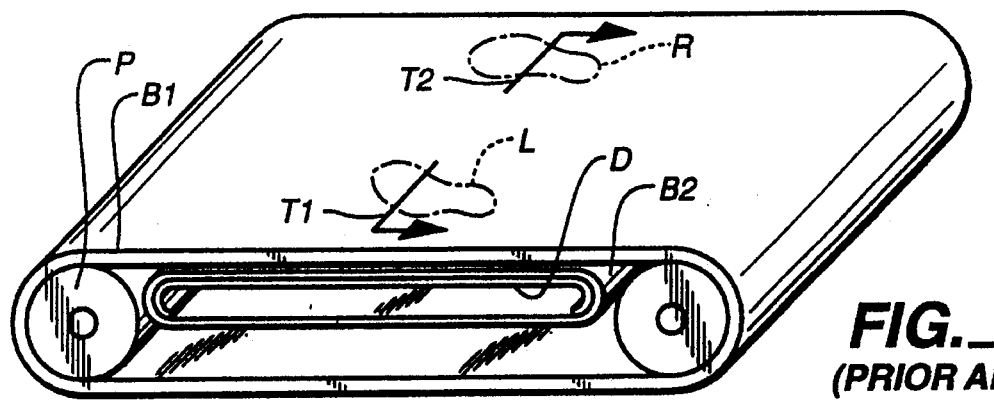
FIG._1
(PRIOR ART)
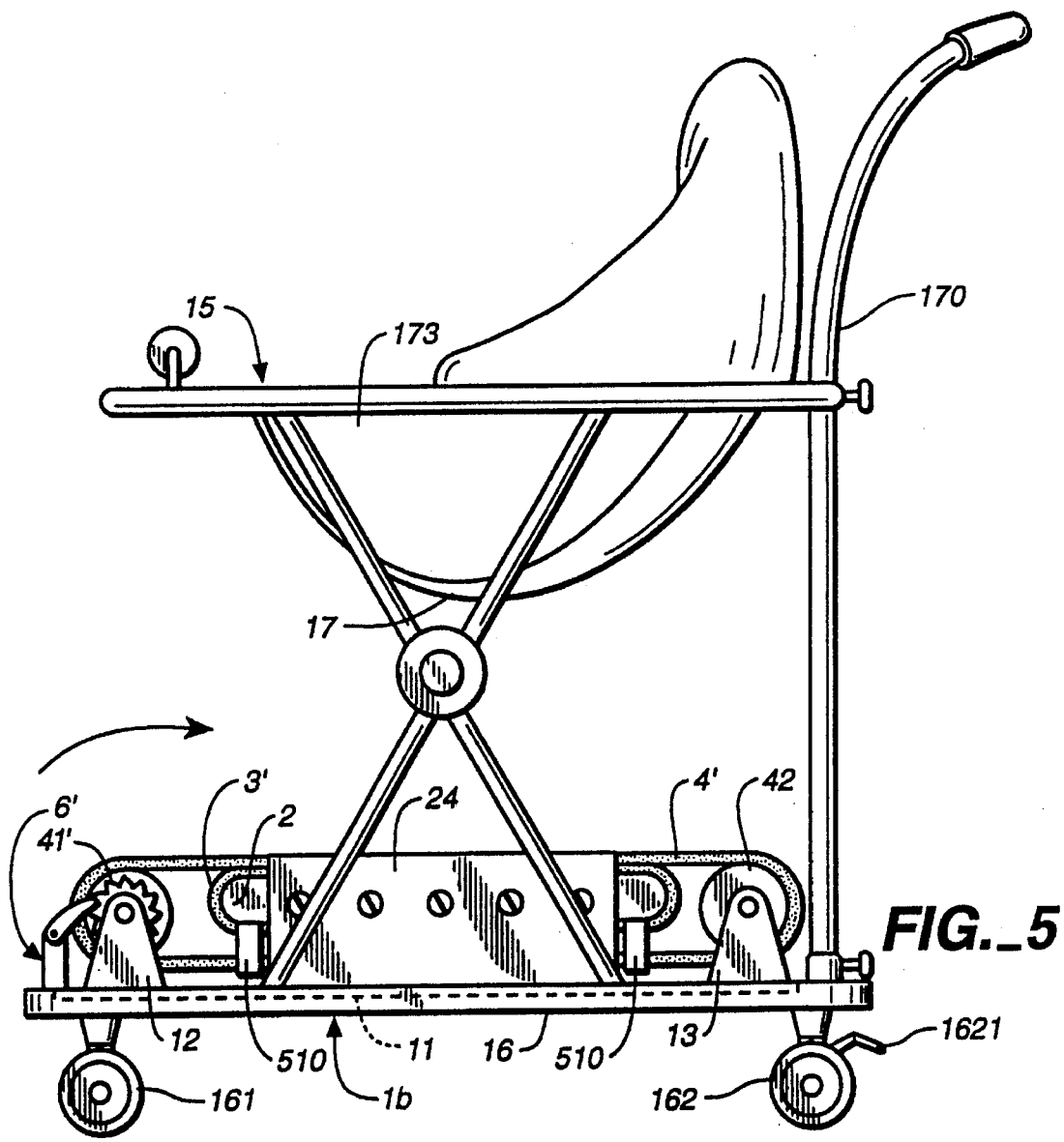
FIG._5

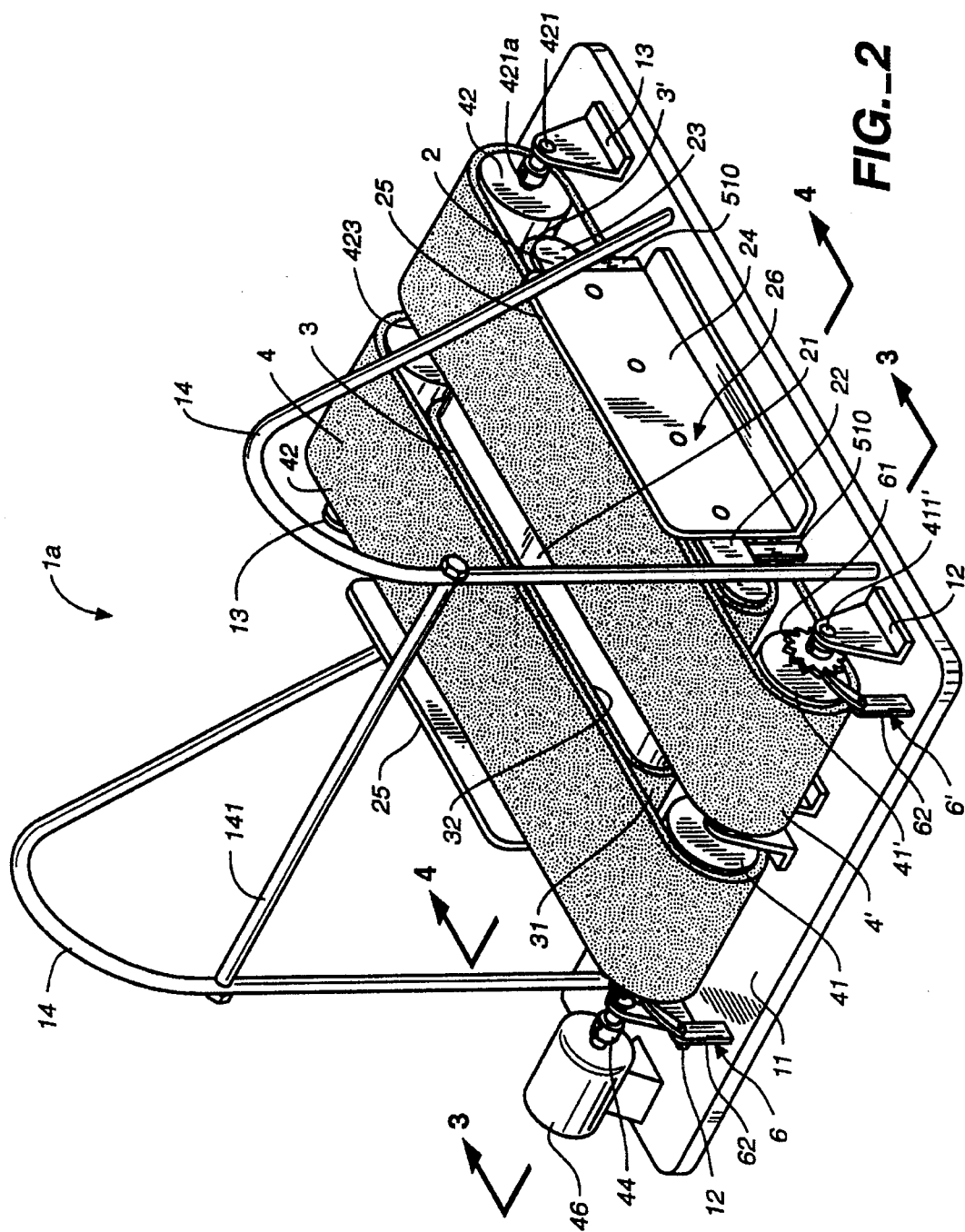
FIG._2

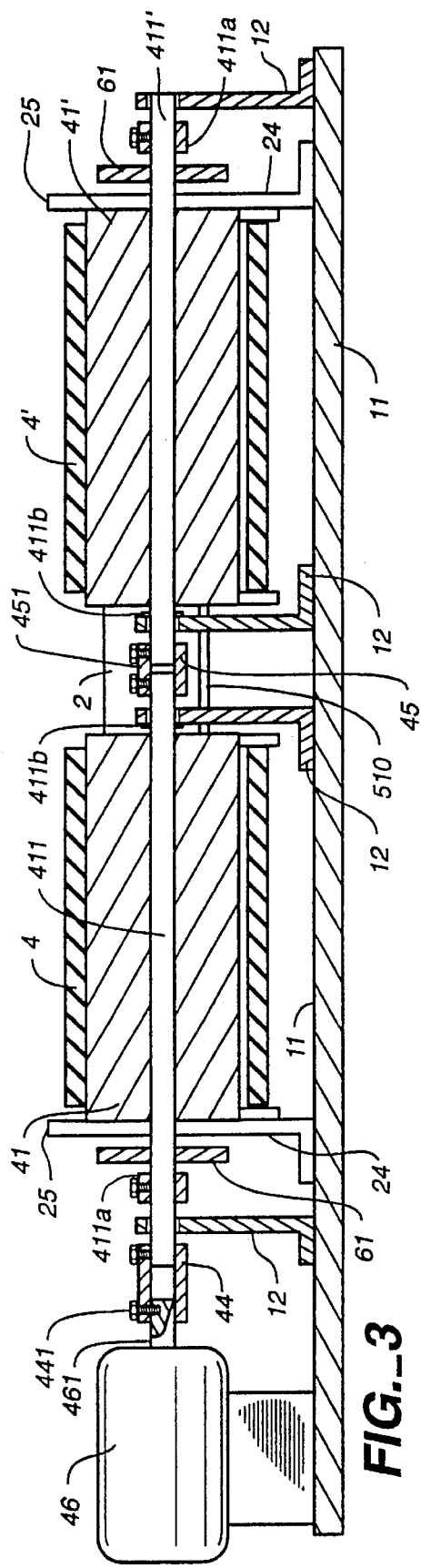
FIG._3
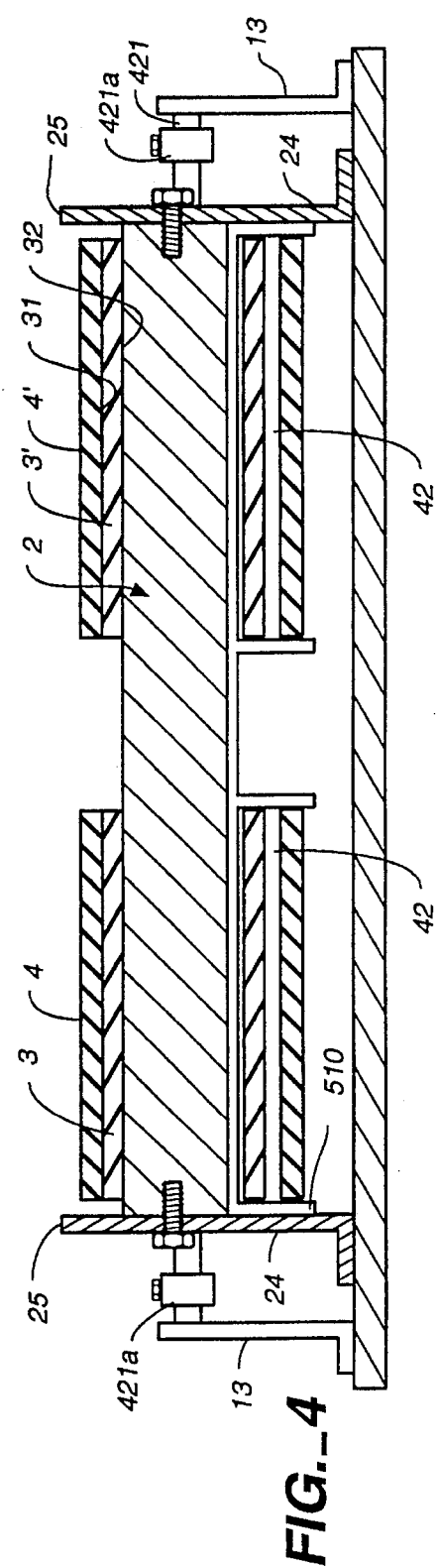
FIG._4

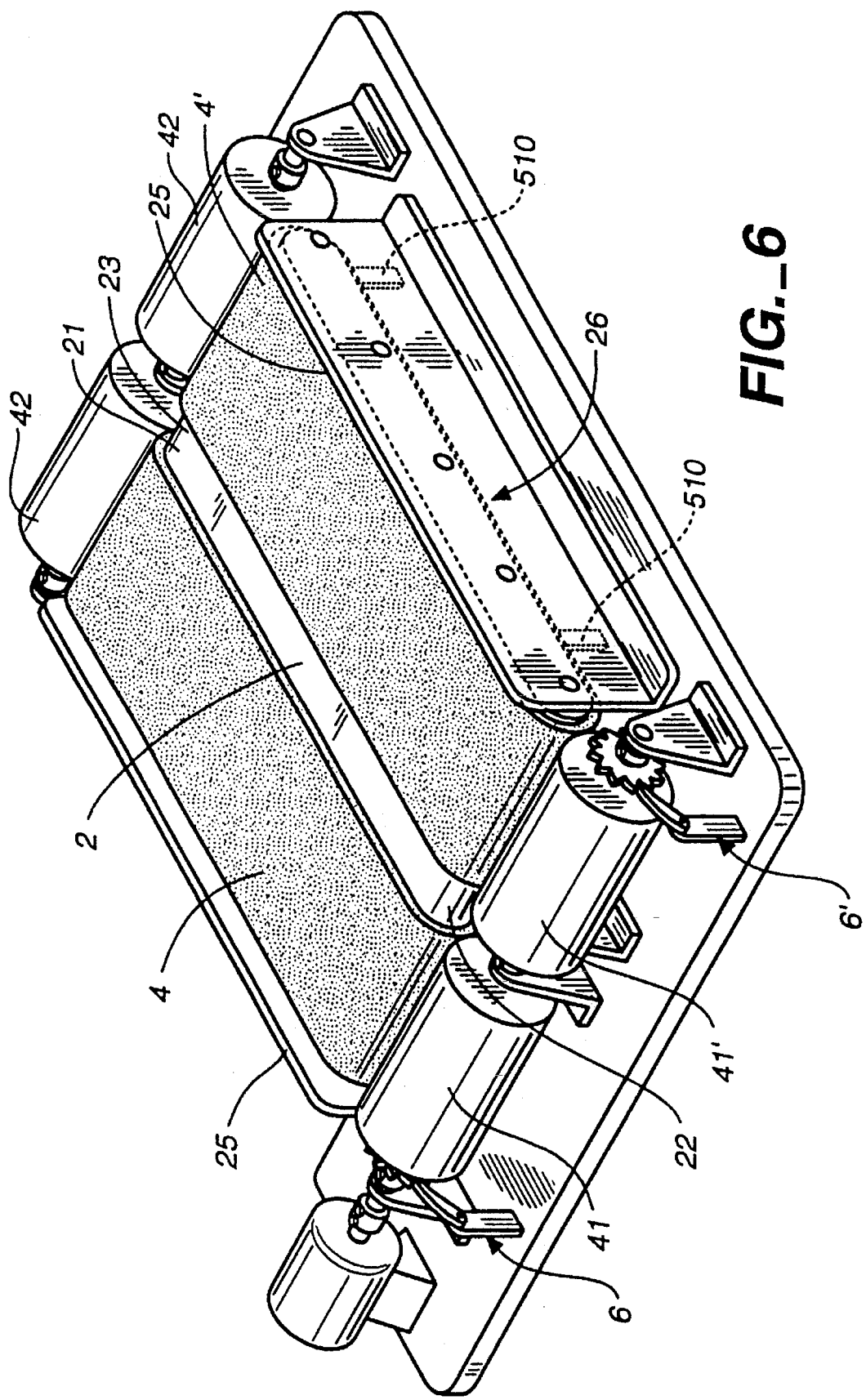

CONVERTIBLE TREADMILL APPARATUS WITH LEFT AND RIGHT FOOT BELTS

This application is a continuation-in-part application of U.S. pat. application No. 08/276,996 now U.S. Pat. No. 5,538,489, which was filed by the applicant on Jul. 19, 1994, which is a continuation-in-part application of application Ser. No. 08/236,585 filed on May 2, 1994 now abandoned, and which, is a continuation-in-part application of application Ser. No. 08/169,143 filed on Dec. 17, 1993. The latter application issued as U.S. Pat. No. 5,411,279 on May 2, 1995.

FIELD OF THE INVENTION

This invention relates in general to walker apparatuses, more particularly to a convertible treadmill which prevents the action of the user's left foot from influencing the of his right foot and vice-versa when the treadmill apparatus is in use. It further relates to a structure that provides means to convert independent foot belts to belts that move concurrently together in fixed tandem, and to means for motorizing such fixed-tandem belt pairs.

BACKGROUND OF THE INVENTION

Referring to FIG. 1, a running track disclosed in Russian Patent No. 961,712 and issued to Morozov comprises an endless rubberized bearing belt (B1) mounted on pulleys (P) and a support deck (D) under the upper branch of the bearing belt (B1). An inner endless belt (B2) is rounded freely on the support deck (D) and is made of a material which has antifriction properties with respect to the surface of the support deck (D). The running track of Morozov is not suited for use as a treadmill apparatus by people with uncoordinated feet movement, such as small children, physically handicapped people and old people, since the left and right feet of the user both tread a single, wide bearing belt (B1) at the same time. Thus, a twisting moment (T1), (T2) applied by either the left foot (L) or the right foot (R) when treading the left-side or right-side parts of the bearing belt (B1) may influence smooth running of the latter relative to the inner endless belt (B2).

U.S. Pat. No. 4,204,673 to Speer, Sr., discloses a dual-tread exerciser which uses a large plurality of parallel roller bearings to support the treads. Such roller bearings have proven to be uncomfortable on the feet and are not suited for use by children and others having sensitive feet or who desire a more comfortable feel, particularly when exercising barefoot. Two motors are required to motorize the device of Speer, Sr.

SUMMARY OF THE INVENTION

Therefore, an object of the present invention is to provide a dual-belt treadmill or walker apparatus which prevents the action of the user's left foot from influencing the action of his right foot and vice-versa when the apparatus is in use and which is convertible for use in the manner of a single-belt device.

More specifically, one object of the present invention is to provide a treadmill apparatus with left and right foot belts that move independently and that are to be treaded respectively by the right and left feet of the user, thereby preventing the action of the user's left foot from influencing the action of his right foot and vice-versa when the treadmill apparatus is in use. (Note that in accordance with accepted drawing conventions, left and right portions of an apparatus are labeled according to the viewer's perspective when facing the front of the device or when reading the drawing. Accordingly, when a user mounts the apparatus, his or her right foot contacts what will be called herein the left belt. Similarly, the user's left foot contacts the right belt.)

Another objective of the present invention is to provide means for convening such a treadmill or walker apparatus back to the conventional state wherein the left and right foot belts again move in fixed tandem. Users may desire such convertibility, for example, in such cases as a child growing older and becoming able to coordinate foot movements, a patient becoming well and regaining such coordination, and the like. Accordingly, the treadmill apparatus or treadmill has the facing end portions of each separate front shaft extending toward each other beyond the brackets on which the front shafts are mounted. A small space is provided between the ends of said shafts. Journaled over the facing shaft ends is a cylindrical collar having set screws or equivalent collar fixing means at each end thereof. Preferably the collar is slidably mounted on one shaft end so it can be slid to engage the end of the shaft extending toward it. The tightening of the set screws onto the shafts ends will connect, or gang, the left and right rollers together, causing them to move together at the same time, in fixed tandem. Alternatively, one end of the collar may be more or less permanently fixed to one shaft (by welding, set screw or the like) and the opposite free end thereof arranged always to extend over and around the other shaft. Tightening a set screw on the free end gangs the shafts (and thereby the belts) in fixed tandem. Loosening the collar fixing means frees them for independent rotation—without the need to slide the collar back and forth.

Yet another objective is to provide means for motorizing the treadmill apparatus when in the fixed-tandem belt state. Accordingly, the other end of one of the front shafts extends beyond the outboard bracket on which it is mounted. An electric motor is mounted on said mounting base with the motor shaft spaced slightly from and aligned coaxially with the front roller shaft that extends beyond its outboard bracket. Mounted on the motor shaft is a second collar with a set screw or equivalent collar fixing means at each end thereof, which collar can be slid to engage the end of the roller shaft extending toward it. The tightening of the set screws on the motor shaft collar will cause the left and right rollers to turn together concurrently in tandem when the motor is energized. In addition to being well suited for general exercise, this embodiment is useful for treating injuries and certain kinds of illnesses wherein the patient needs to be assisted in walking, or indeed, to be forced to walk in order to recuperate.

Another objective of the present invention is to provide a treadmill apparatus which may be used with any of a number of functional supporting frames, such as the functional supporting frame of an exercise treadmill or walker. The latter has an adjustable hand bar for use by small children, physically handicapped people, old people and by those who feel more confident holding onto something while exercising.

Still another objective of the present invention is to provide a treadmill apparatus which may be used with the functional supporting frame of a baby stroller or a baby chair so as to provide a safe and effective way for exercising a baby and for teaching the baby to stand and walk.

Accordingly, the treadmill apparatus of the present invention comprises a mounting base, a pair of front rollers, a pair of rear rollers, endless left and right foot belts, and a support means. The mounting base has left and right front sides, independently rotatable left and right front shafts extending along a common transverse axis from the left front side to the right front side of the mounting base, left and right rear sides, and a rear shaft extending from the left rear side to the right rear side. The front rollers are mounted fixedly on the front shafts and are disposed respectively on the left and right front sides of the mounting base. The rear rollers are mounted rotatably on the rear shaft and are disposed respectively on the left and right rear sides of the mounting base. Each of the foot belts engages a respective one of the front rollers and a respective one of the rear rollers. The support means is disposed between the pair of front rollers and the pair of rear rollers and provides a supporting base or surface for the foot belts. Thus, the presence of weights (i.e., feet) which move separately on the foot belts between the pair of front rollers and the pair of rear rollers will cause the foot belts to move and the front and rear rollers to rotate.

The mounting base may further have two pair of spaced front brackets disposed adjacent to the left and right front sides thereof and in the front middle thereof and a pair of spaced rear brackets disposed adjacent to the left and right rear sides thereof. The front shafts each have two ends turning within a pair of front brackets, while the rear shaft has two ends fixed respectively to the two rear brackets. The front shafts each have retainers at two opposite end portions to limit lateral movement of the front shafts. The rear shaft has a central portion provided with a collar or like spacer to separate the rear rollers, and two opposite end portions provided with spacers, collars or similar known retainers to limit lateral movement of the rear rollers.

Each of the front rollers may have an outer end with a ratchet gear attached thereto. The mounting base further has a pair of pawls which releasably engage the ratchet gears on the front rollers.

In one embodiment of the treadmill apparatus of the present invention, each of the endless left and right foot belts has a frictional inner surface and is wound circulatively on the respective one of the front rollers and on the respective one of the rear rollers. The support means comprises an elongate solid substrate base and endless left and right inner belts. The substrate base is secured on the mounting base and has left and right sides, a flat slippery top surface and two arcuate ends, which ends continue the slippery top surface. The inner belts are wound circulatively on the arcuate ends of the substrate base and are disposed respectively on the left and right sides of the substrate base. Each of the inner belts has a slippery inner surface that contacts the substrate base and a frictional outer surface that contacts the frictional inner surface of a respective one of the foot belts. The substrate base further has a downwardly projecting guide bracket which separates the inner belts and the foot belts and limits their lateral movement. The substrate base is held up by brackets which have a short pair of upwardly projecting flanges that extend on opposite longitudinal edges of the substrate base.

In a further embodiment of the treadmill apparatus of the present invention, the support means comprises a substrate base secured on the mounting base and having a slippery top surface. Each arcuate end of the substrate base continues the slippery outer top surface. Each of the foot belts has a slippery inner surface that contacts the substrate base and substrate base ends, and has a frictional outer surface. Each of the foot belts is wound around the substrate base and passes between and is in operating contact with one of the front rollers and the front substrate base end. Each foot belt further passes between and is in operating contact with one of the rear rollers and the rear substrate base end. The substrate base further has a downwardly projecting guide bracket which separates and limits the travel of the foot belts, and a pair of upwardly projecting bracket flanges which extend on opposite longitudinal edges of the substrate base.

Any one of the different embodiments of the treadmill apparatus of the present invention may further comprise the functional supporting frame of an exercise walker, a baby chair or a baby stroller. When used as an exercise device, the treadmill or walker apparatus is an ideal way of losing weight and keeping fit. When used as a baby chair or baby stroller, the apparatus provides a safe and effective way for exercising a baby and for teaching the baby to stand and walk.

BRIEF DESCRIPTION OF THE DRAWINGS

Other features and advantages of the present invention will become apparent in the following detailed description of the preferred embodiments with reference to the accompanying drawings, of which:

FIG. 1 illustrates a conventional running track which uses outer and inner endless belts;

FIG. 2 is a perspective view of the first preferred embodiment of a treadmill apparatus according to the present invention, the first preferred embodiment being attached to a first example of a functional supporting frame so as to serve as an exercise treadmill or walker;

FIG. 3 is a schematic sectional view of FIG. 2 taken along line 3—3;

FIG. 4 is a schematic sectional view of FIG. 2 taken along line 4—4;

FIG. 5 is a schematic side view of the first preferred embodiment when attached to a second example of a functional supporting frame so as to serve as a combined baby stroller (or chair) and walker;

FIG. 6 is a perspective view of the second preferred embodiment of a treadmill apparatus according to the present invention.

| Drawing Reference Numerals | |
|---|---|
| B1 | bearing belt |
| B2 | inner belt |
| P | pulleys |
| D | deck |
| R | right foot |
| L | left foot |
| T1 | moment |
| T2 | moment |
| 1a | functional supporting frame |
| 1b | functional supporting frame |
| 11 | mounting base |
| 12 | front brackets |
| 13 | rear brackets |
| 14 | handrails |
| 141 | handbar |
| 15 | upper frame portion |
| 16 | lower frame portion |
| 161 | front wheels |
| 162 | rear wheels |
| 1621 | brake |
| 17 | baby seat |
| 170 | removable handle unit |
| 173 | leg holes |
| 2 | substrate base |
| 21 | slippery top surface |
| 22 | front end |
| 23 | rear end |

-continued

| Drawing Reference Numerals | |
|---|---|
| 24 | side brackets |
| 25 | flanges |
| 26 | support unit |
| 3 | left inner belt |
| 3' | right inner belt |
| 31 | frictional outer belt surface |
| 32 | slippery inner belt surface |
| 4 | left foot belt |
| 4' | right foot belt |
| 41 | left front roller |
| 41' | right front roller |
| 411 | left front shaft |
| 411' | right front shaft |
| 411a | retainers |
| 411b | spring clip rings |
| 42 | rear rollers |
| 421 | rear shaft |
| 421a | retainers |
| 423 | spacer |
| 44 | second collar |
| 441 | set screws |
| 45 | first collar |
| 451 | set screws |
| 46 | motor |
| 461 | motor shaft |
| 510 | guide bracket |
| 6 | left unidirectional control means |
| 6' | right unidirectional control means |
| 61 | ratchet gears |
| 62 | pawls |

DETAILED DESCRIPTION OF THE PREFERRED EMBODIMENTS

Before the present invention is described in greater detail, it should be noted that like elements are indicated by the same reference numerals throughout the disclosure. Furthermore, as noted above, "left" and "right" are conventionally described with respect to a frontal view of the apparatus as seen in the drawing. When a user mounts the apparatus, his or her perspective is reversed, i.e., the user's left foot is placed on the what nevertheless will be called herein the right side of the apparatus and the user's right foot is placed on what will be called the left side thereof.

Referring to FIGS. 2 to 4, the first preferred embodiment of a treadmill apparatus according to the present invention is shown to comprise a mounting base 11; a pair of left and right front rollers 41, 41'; a pair of rear rollers 42; endless left and right foot belts 4, 4'; and a support unit 26. The mounting base 11 has a pair of spaced front brackets 12 disposed adjacent to left and right front sides of the mounting base 11; a left front shaft 411 which extends from the left front side to the front mid-portion and which has two ends rotatably journaled respectively within a first pair of front brackets 12; a right front shaft 411' which extends coaxially with the left front shaft 411 from the front mid-portion to the right front side and which has two ends rotatably journaled respectively within a second pair of front brackets 12; a pair of spaced rear brackets 13 disposed adjacent to the left and right rear sides of the mounting base 11; and a rear shaft 421 which extends from the left rear side to the right rear side and which has two ends secured on the rear brackets 13.

The left and right front rollers 41, 41' are mounted fixedly on the rotatable front shafts 411, 411' and are disposed respectively on the left and right front sides of the mounting base 11. The fixed-roller front shafts 411, 411' are further provided, immediately adjacent to brackets 12, with a plurality of shaft retainers 411a in amounts and at positions commonly known in the art to be appropriate for limiting lateral movement of the shafts within their brackets. For clarity of illustration, only two schematic retainers 411a are shown in the broadly schematic view of FIG. 3. Other types of suitable shaft retainers would include spring clips fitting in circumferential grooves in the shafts. For example, conventional spring clip rings 411b are appropriate in narrow spaces, such as at the inboard ends of the rollers 41, 41'. In practice, retainers 411a will be mounted immediately adjacent to brackets 12, to minimize transverse play.

The rear rollers 42 are mounted rotatably on the fixed rear shaft 421 and are disposed respectively on left and right rear sides of the mounting base 11. An appropriate conventional bearing, collar or loose spacer 423 (hidden in the drawing) is mounted rotatably on a central portion of the rear shaft 421 to separate the rear rollers 42. The rear shaft 421 is further provided with a pair of retainers 421a on two opposite end portions thereof to limit lateral movement of the rear rollers 42. Retainers 421a may further be augmented or replaced with collars, spacers, clip rings, or similar loose fittings, whose shapes and functions are well known in the art, with which to limit side to side movement of the rear rollers 42.

In order for the apparatus to function in accordance with the objectives of this invention, the front rollers 41, 41' must be immovably fixed to a pair of rotatable front shafts 411, 411'. However, the rear rollers 42 might be rotatable about a single fixed rear shaft (as drawn and described), might be rotatable about a single rotatable rear shaft, might be fixed to a pair of rotatable rear shafts, might be rotatable about a pair of fixed rear shafts, or might be made independently rotatable by any other such rear shaft means. Preferably, the rear shaft 421 is screwed in place on the brackets 13. Were rear shaft 421 to be made rotatable, suitable collars, retainers or other common mechanisms would be added as appropriate to restrain it and its associated rollers from lateral travel. To allow for some lateral play, a rotatable rear shaft would likely have its ends extend somewhat out beyond their respective brackets, as would all front shaft ends.

Each of the foot belts 4, 4' engages a respective one of the from rollers 41, 41' and a respective one of the rear rollers 42. In this embodiment, the foot belts 4, 4', are wound circulatively on the respective one of the front rollers 41, 41' and on the respective one of the rear rollers 42.

Turning now to the sectional detail shown in FIG. 3, roller shafts 411, 411' have journaled around their adjacent coaxial inboard ends a first hollow cylindrical collar 45. Collar fixing means, preferably comprising a pair of set screws 451, allows the first collar to be releasably secured to the inboard ends. When the collar fixing means is engaged by tightening the set screws 451, the shafts 411, 411' are ganged together so as to cause the front rollers 41, 41' to move simultaneously together in fixed tandem. However, in normal operation of the device, independent travel of the front rollers is desired, in which case one of the set screws 451 is loosened. This frees one shaft end from the collar 45 and releases the front shafts for independent rotation. Preferably, to prevent any friction between the collar 45 and the free shaft end, both set screws 451 will be loosened and the collar slid to one side or the other so as to clear the small gap between the inboard ends of the shafts 41, 41'. Note that for clarity of illustration, the collar 45 has been drawn slightly elongated. In actual practice, it will be short enough to be easily slid back behind the shaft end gap.

When the treadmill apparatus is in the ganged or fixed-tandem belt state described above (the collar 45 being rigidly fixed to both front shafts 411, 411'), it may be desirable in certain applications to motorize the operation of the foot belts 4, 4' through the activation of the electrical motor 46. This may be accomplished by means of a second hollow cylindrical collar 44 or equivalent shaft-ganging means. The motor 46 is mounted on a suitable extension of the mounting base 11 and has a motor shaft 461 aligned coaxially with and spaced slightly apart from the outboard end of the left front shaft 4 11, which outboard end projects laterally outward from its associated outboard bracket 12. The second collar 44 can be slid toward and over the adjacent end of the left roller shaft 4 11, as shown, and both set screws 441 tightened. The tightening of all set screws 441, 451 on both collars 44, 45, respectively, will cause the left and right front rollers 41, 41' to turn together concurrently in fixed tandem, and thereby the belts 4, 4' as well, when the motor 46 is energized.

As noted above, in the presently preferred mode of operation, the collars 44, 45 will be loosened on at least one end each thereof so that the foot belts 4, 4' may be operated manually and independent or each other by the feet of the user.

Referring again in general to FIGS. 1–4, a unidirectional control means 6, 6' is installed to permit only unidirectional rotation of the left and right foot belts 4, 4'. In this embodiment, the control means 6, 6' includes a pair of ratchet gears 61 attached to or near outer ends of the front rollers 41, 41' and mounted fixedly on the left and right shafts 411, 411'. It further includes a pair of pawls 62 secured to the mounting base 11 and engaging one of the ratchet gears 61. This permits only unidirectional rotation of the front rollers 41, 41', thereby preventing bi-directional movement of the foot belts 4, 4'. A pawl release means (not shown), chosen from of a number of available conventional pawl and ratchet designs, may be provided to release selectively the pawls 62 from the ratchet gears 61 in a known manner, to permit reciprocating movement of the foot belts 4, 4'. This could be done when it is desired, for example, to use the apparatus as a ski exerciser. Of course, the ratchet gears may be attached to the rear rollers 42 to achieve the same result.

The support unit 26 is disposed between the pair of front rollers 41, 41' and the pair of rear rollers 42 and provides a substantially flat supporting surface or base for the foot belts 4, 4'.

In this embodiment, the support unit 26 includes an elongate substrate base 2, preferably of thick solid construction, secured on a pair of side brackets 24 that extend upwardly from opposite longitudinal sides of the mounting base 11. The unit further includes endless left and right inner belts 3, 3' wound respectively on left and right sides of the substrate base 2. The pair of brackets 24 (or, alternatively, the substrate base 2) has a pair of flanges 25 extending upwardly only about ¼ inch along opposite longitudinal edges of the substrate base (the extent of such extension being exaggerated somewhat in the drawing). Inwardly-directed narrow strips or fillets could be added to, or in place of, the flange extensions 25 to fill in substantially all of the small gap between the flanges 25 and the outer edges of belts 3, 3', 4, and 4' (FIG. 4). Such filler strips would serve as means to limit lateral movement of the inner belts 3, 3' and the foot belts 4, 4'.

The substrate base 2 has a flat slippery top surface 21 and arcuate front and rear ends 22, 23. The inner belts 3, 3' are wound circulatively on the arcuate front and rear ends 22, 23 of the substrate base 2 and are disposed respectively on left and right sides of the substrate base 2. Each of the inner belts 3, 3' has a slippery inner surface 32 that contacts the top surface 21 of the substrate base 2, and a frictional outer surface 31 that contacts a respective one of the foot belts 4, 4'. Each of the foot belts 4, 4' has frictional inner and outer surfaces and an upper branch which overlaps the respective one of the inner belts 3, 3'. The inner belts 3, 3' of this embodiment comprise one means associated with the foot belts 4, 4' to provide slippery contact with the TEFLON-coated or silicone-coated substrate-base top surface 21.

Affixed across the bottom of the substrate base 2 is an downwardly projecting guide bracket 510 which groups and separates by left group and right group the inner belts 3, 3+ and the foot belts 4, 4'. The bracket 510 is the preferred means to limit lateral movement of the belt groups. Preferably, however, for safety purposes, as well as to provide an attractive overall appearance, moving parts (other than the intended contact portions of the belts) and other delicate or dangerous parts will be protected with appropriate molding covers and facing strips. For example, a thin flat strip should be placed on the top of the substrate base 2 in the gap between the belt groups. Covers for the belt ends would be appropriate at the ends of the substrate base 2. Such moldings could contain further means to limit lateral movement of the belts.

When in use, the user's feet drive a respective foot belt 4, 4', rather than a single, common wide belt as taught in the conventional running track described beforehand. Thus, the foot belts 4, 4' move independently when treaded by, respectively, the right and left feet of the user, thereby preventing the action of the user's left foot from influencing the action of his right foot and vice-versa to permit natural, comfortable and a more ergonomic form of walking when the treadmill apparatus of the present invention is in use.

When the user applies a moving weight, such as his feet, on the left and right foot belts 4, 4' between the pair of front rollers 41, 41' and the pair of rear rollers 42, the foot belts 4, 4' will drive frictionally the rollers 41, 41', 42. Due to the slippery top surface 21 of the substrate base 2 and the slippery inner surface 32 of the inner belts 3, 3' and due to the frictional outer surface 31 of the inner belts 3, 3' and the frictional inner surface of the foot belts 4, 4', the foot belts 4, 4' and the inner belts 3, 3' slide smoothly on the substrate base 2 when the user treads on the foot belts 4, 4'. The frictional outer surface of the foot belts 4, 4' ensures traction with the user's feet so as to enable the foot belts 4, 4' to be driven properly.

It is noted that the arcuate ends 22, 23 of the substrate base 2 may be replaced by two coaxial pairs of rollers (not shown) to achieve a similar effect in any of the embodiments of the invention.

Referring once more to FIG. 2, the mounting base 11 is attachable to a functional supporting frame 1a. In this embodiment, the functional supporting frame 1a comprises a pair of handrails 14 mounted on opposite longitudinal sides of the mounting base 11 to permit use of the walker apparatus as an exercise treadmill. The handrails 14 are generally of an inverted V-shape. A hand bar 141 extends between the handrails 14 and has two ends connected adjustably along one side of each of the handrails 14 in a known manner. The walker apparatus is thus ideal for use by small children, physically handicapped people, old people and by those who feel more confident holding onto something while exercising. This form of an exercise treadmill is well suited for emplacement in hospitals and in retirement homes, and is ideal for use by those who wish to keep fit and lose weight.

Referring to FIG. 5, the first preferred embodiment may be attached to a functional supporting frame 1b that is in the form of a baby stroller. The functional supporting frame 1b comprises an upper frame portion 15; a lower frame portion 16 provided with front and rear wheels 161, 162 and connected to the mounting base 11 to support the mounting base 11 under the upper frame portion 15; and a baby seat 17 secured to the upper frame portion 15. The functional supporting frame 1b may be provided with a removable handle unit 170, which is attached removably to the upper and lower frame portions 15, 16 for pushing the functional supporting frame 1b. Furthermore, the front wheels 161 may be provided with a respective swivel which is rotatable about longitudinal axes of supporting legs of the front wheels 161 in a known manner. The rear wheels 162 may be provided with a respective brake 1621. As can readily be seen, with the handle 170 removed and with the wheels 161 either locked with the brake 1621 or removed, the functional supporting frame 1b serves as a stationary baby chair having an integral walker. Ratchet gears with pawls (unidirectional control means 6') can aid in proper walking.

When the first preferred embodiment is used with the functional supporting frame 1b a pair of leg holes 173 formed in the baby seat 17 permits the legs of a baby to extend toward the mounting base 11 so as to tread the foot belts 4, 4'. A baby thus can be taught to stand and walk with the use of the walker apparatus of the present invention. Unlike the conventional wheeled open-bottom baby walker, the present invention is safe to use since the baby is prevented from moving around the room and from bumping into furniture or from falling down the stairs. The functional supporting frame 1b may be further provided with safety belts (not shown) for strapping the baby thereon.

Referring to FIG. 6, the second preferred embodiment of a treadmill apparatus according to the present invention is shown to be substantially similar to the first preferred embodiment. In this embodiment, the support unit 26 comprises a substrate base 2, preferably solid, secured on the mounting base 11 and having a slippery top surface 21. However, no endless inner belts are employed in the second preferred embodiment. Each of the foot belts 4, 4' is wound around the substrate base 2 and passes between and is in operating contact with one of the front rollers 41, 41' and with the front arcuate substrate base end 22. Each further passes between and is in operating contact with one of the rear rollers 42 and with the rear arcuate substrate base end 23. Each of the foot belts 4, 4' has an outer surface which is made of a friction material, such as rubber, to provide traction with the user's feet, and an inner surface which is made of a slippery material, such as a TEFLON-coated or silicone-coated material, to contact the substrate base the foot belts 4, 4' have different properties, each of the foot belts 4, 4' may be in the form of a laminate, the layers of which may be joined in any suitable fashion, such as by sewing, gluing and the like. Alternatively, a TEFLON, silicone, or like slippery coating may be applied directly on the inner surfaces of the foot belts 4, 4' to achieve the same effect. The slippery inner surface of the foot belts 4, 4' of this embodiment comprises alternative means associated with the foot belts to provide slippery contact with the silicone-coated substrate-base top surface 21.

As with the first preferred embodiment, the substrate base 2 further has at least one guide bracket 510 which separates the foot belts 4, 4', and a short pair of upwardly extending flanges 25, preferably on the side brackets 24, which flanges extend along opposite longitudinal edges of the belts. With suitable attached filler strips, the flanges 25 could be used to further limit lateral movement of the foot belts 4, 4'.

Like the previous embodiments, the second preferred embodiment can also be installed with either of the previously described functional supporting frames 1a or 1b. The operation of the second preferred embodiment is substantially similar to that of the first preferred embodiment and will not be detailed further.

While the term "convertible" is used to describe the preferred embodiments of the present invention, each of three kinds of apparatus are intended to be covered herein and in the claims hereto as separate and combination structures, namely, freely moving left and right side belts, fixed-tandem concurrently moving left and right side belts, and the latter moved by a motor.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements. As just one example, the from and rear roller pairs of each embodiment could have means for increasing or decreasing the distance between them longitudinally so as to stretch or relax the belts and so vary the effort required to operate the apparatus. As another example, the coating on the substrate base may consist of a material, such as paper, coated with a suitable slippery substance. Such paper may be attached to the top of the substrate base, forming the slippery top surface thereof, and could be easily replaced if it should wear out.

I claim:

1. Treadmill apparatus including:

a mounting base attachable to a functional supporting frame, said mounting base having first and second mounting base ends;

first and second rollers transversely mounted coaxially one on each side of said first mounting base end with each said first and second roller fixedly mounted on separate first and second shafts, which said first and second shafts turn in first and second bracket pairs, respectively, one said bracket pair for each said first and second shaft, said first and second bracket pairs being mounted on said first mounting base end;

third and fourth rollers mounted rotatably on at least one third transverse shaft extending from side to side on said second mounting base end with said third shaft mounted in at least one third pair of brackets at said second mounting base end, all said roller shafts being mounted with their axes parallel to the axes of the others;

endless first and second foot belts, said first foot belt engaging said first and third rollers, said second foot belt engaging said second and fourth rollers;

support means for said foot belts comprising a flat-topped substrate base with arcuate ends, said substrate base disposed longitudinally between said rollers between said mounting base ends, said substrate base being secured to said mounting base by means of side substrate base brackets, said substrate base with said arcuate ends having a slippery top surface, and means associated with said foot belts to provide slippery contact with said slippery substrate-base top surface, whereby movements of said first and second foot belts will coincide with the turning of said first and third rollers and said second and fourth rollers, respectively.

2. The apparatus of claim 1 wherein:

said slippery contact providing means includes each of said first and second foot belts having an outer frictional foot-belt surface and an inner frictional foot-belt surface, which said inner frictional foot-belt surfaces engage, respectively, said first and third rollers and said second and fourth rollers by being wound circulatively around each said respective roller and around said substrate base; and endless first inner and second inner belts under, respectively, said first and second foot belts, each said first and second inner belts having a frictional outer inner-belt surface in contact with said frictional inner foot-belt surfaces of said first and second foot belts, respectively, and having slippery inner inner-belt surfaces in contact with said slippery substrate-base top surface, said inner belts being wound circulatively around said substrate base and around said arcuate substrate-base ends;

and further including means to limit lateral movement of said foot belts and said inner belts across said substrate base.

3. The apparatus of claim 2 further including:

facing first and second inner end portions of said first and second shafts, respectively, said inner shaft-end portions extending coaxially toward each other beyond the brackets of said first and second bracket pairs on which their said first and second shafts are mounted and said inner shaft-end portions having a small space between them; and a first collar having a first collar fixing means, which first collar is mounted on one of said first and second inner shaft-end portions so said first collar can releasably engage the other of said first and second inner shaft-end portions, whereby the engaging of said first collar fixing means onto said inner shaft-end portions will cause said first and second rollers to move concurrently in fixed tandem.

4. The apparatus of claim 3 further including:

an outer end portion of one of said first and second shafts, which outer shaft-end portion extends beyond the bracket of said first and second bracket pairs on which it is mounted;

an electric motor mounted on said mounting base and having a motor shaft coaxially spaced slightly apart from said outer shaft-end portion; and a second collar having a second collar fixing means, one at each second-collar end, said second collar being mounted on said motor shaft so said second collar can releasably engage said outer shaft-end portion, whereby the engaging of second collar fixing means onto said inner shaft-end portions and onto said motor shaft and said outer shaft-end portion, respectively, will cause said first and second rollers to turn concurrently in fixed tandem when said motor is energized.

5. The apparatus of claim 2 further including:

a pair of ratchet gears attached in operative engagement one each with either said first and second rollers or said third and fourth rollers; and a pair of pawls located on said mounting base which releasably engage said pair of ratchet gears.

6. The apparatus of claim 1 wherein:

said slippery contact providing means includes each of said first and second foot belts having an outer frictional foot-belt surface and an inner slippery foot-belt surface that contacts said slippery substrate-base top surface, said outer frictional foot-belt surfaces of said first and second foot belts engaging, but not winding around, said first and third rollers and said second and fourth rollers, respectively, and winding around both arcuate substrate-base ends, whereby, due to close positioning of each said roller to respective said arcuate substrate-base ends, said inner slippery foot-belt surface of each foot belt contacts and freely turns around said slippery arcuate substrate-base ends, and said outer frictional foot-belt surfaces frictionally engages and turns said rollers, so that said first foot belt will turn together with said first and third rollers and said second foot belt will turn with said second and third rollers;

and further including means to limit lateral movement of said belts across said substrate base.

7. The apparatus of claim 6 further including:

an outer end portion of one of said first and second shafts, which outer shaft-end portion extends beyond the bracket of said first and second bracket pairs on which it is mounted;

an electric motor mounted on said mounting base and having a motor shaft coaxially spaced slightly apart from said outer shaft-end portion; and a second collar having a second collar fixing means, one at each second-collar end, said second collar being mounted on said motor shaft so said second collar can releasably engage said outer shaft-end portion, whereby the engaging of second collar fixing means onto said inner shaft-end portions and onto said motor shaft and said outer shaft-end portion, respectively, will cause said first and second rollers to turn concurrently in fixed tandem when said motor is energized.

8. The apparatus of claim 7 further including:

an outer end portion of one of said first and second shafts, which outer shaft-end portion extends beyond the bracket on which it is mounted;

an electric motor mounted on said mounting base and having a motor shaft coaxially spaced slightly apart from said outer shaft-end portion; and a second collar having a second pair of set screws, one at each second-collar end, said second collar being slidably mounted on said motor shaft so said second collar can be slid to engage said outer shaft-end portion, whereby the tightening of said first and second set screw pairs onto said inner shaft-end portions and onto said motor shaft and said outer shaft-end portion, respectively, will cause said first and second rollers to turn concurrently in fixed tandem when said motor is energized.

9. The apparatus of claim 6 further including:

a pair of ratchet gears attached in operative engagement one each with either said first and second rollers or said third and fourth rollers; and a pair of pawls located on said mounting base which releasably engage said pair of ratchet gears.

* * * * *